(12) United States Patent
Lu et al.

(10) Patent No.: US 12,362,873 B2
(45) Date of Patent: Jul. 15, 2025

(54) ENHANCED MULTI-LINK OPERATION SWITCHING MECHANISMS

(71) Applicant: MediaTek Singapore Pte. Ltd., Singapore (SG)

(72) Inventors: Kai Ying Lu, San Jose, CA (US); James Chih-Shi Yee, San Jose, CA (US); Yongho Seok, San Jose, CA (US); Chao-Chun Wang, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 496 days.

(21) Appl. No.: 17/689,807

(22) Filed: Mar. 8, 2022

(65) Prior Publication Data

US 2022/0294583 A1    Sep. 15, 2022

Related U.S. Application Data

(60) Provisional application No. 63/162,090, filed on Mar. 17, 2021, provisional application No. 63/200,496, filed on Mar. 11, 2021.

(51) Int. Cl.
*H04L 5/00* (2006.01)
*H04W 74/0816* (2024.01)
*H04W 76/15* (2018.01)

(52) U.S. Cl.
CPC .......... *H04L 5/0037* (2013.01); *H04L 5/0048* (2013.01); *H04W 74/0816* (2013.01); *H04W 76/15* (2018.02)

(58) Field of Classification Search
CPC ... H04L 5/0037; H04L 5/0048; H04L 5/0091; H04W 74/0816; H04W 76/15; H04W 84/12; H04W 74/006; H04W 74/0808
See application file for complete search history.

(56) References Cited

U.S. PATENT DOCUMENTS

| | | | |
|---|---|---|---|
| 2022/0029736 A1* | 1/2022 | Chu | H04L 1/0023 |
| 2022/0046621 A1* | 2/2022 | Kandala | H04B 7/0697 |
| 2022/0104261 A1* | 3/2022 | Kwon | H04W 48/16 |

* cited by examiner

*Primary Examiner* — Walli Z Butt

(57) ABSTRACT

Embodiments of the present invention provide an improved switching mechanism for multi-link devices that can perform frame exchanges using multiple spatial streams and automatically switch back to a listening mode on enabled links deterministically for improved throughput and reduced latency. Embodiments of the present invention are suitable for multi-link operations performed using a multi-radio device or a single-radio device.

17 Claims, 6 Drawing Sheets

ENHANCED MULTI-LINK OPERATION SWITCHING MECHANISMS

CROSS-REFERENCE TO RELATED APPLICATIONS

This application claims the benefit of and priority to provisional patent application Ser. No. 63/200,496, with filing date Mar. 11, 2021, by Kai Ying Lu, et al., and to provisional patent application Ser. No. 63/162,090, with filing date Mar. 17, 2021, by Kai Ying Lu, et al, both of which are hereby incorporated by reference in their entirety.

FIELD

Embodiments of the present invention generally relate to the field of wireless communications. More specifically, embodiments of the present invention relate to systems and methods for enhanced multi-link operation in a wireless network.

BACKGROUND

Modern electronic devices typically send and receive data with other electronic devices wirelessly using Wi-Fi, and many of these electronic devices are "dual band" devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

The use of a single band may not satisfy the bandwidth or latency needs of certain devices. Therefore, some developing approaches to wireless communication increase communication bandwidth by operating on multiple bands concurrently (technically called link aggregation or multi-link operation). Advantageously, multi-link operations can provide higher network throughput and improved network flexibility compared to traditional techniques for wireless communication.

For MLD devices operating using only a single radio, enhanced multi-link single radio operation (EML) can provide throughput enhancement and latency reduction similar to that of concurrent dual-radio MLDs. EML operation enables a wireless device having a single radio to receive data using multiple channels/links. When a wireless device is operating in the EML mode with an AP that supports the EML mode, the devices can listen on the enabled links by leaving its affiliated wireless stations (STAs) corresponding to those links in an awake state ("listening mode"). The listening operation can include performing clear channel assessment (CCA) and receiving an initial control frame of a frame exchange sequence that is initiated by an AP MLD. The initial Control frame of a frame exchange sequence is sent before any data frame exchanges from the AP MLD to the wireless device operating in the EML mode. The initial Control frame is typically an MU-RTS Trigger frame or a Buffer Status Report Poll (BSRP) Trigger frame.

However, existing approaches to multi-link operations in EML mode are unable to predictably determine exactly when a wireless device will switch back to a listening mode on an enabled link, for example, after a frame exchange sequence has completed. Accordingly, an improved switching mechanism for multi-link operations is needed to take advantage of available links and improve latency and bandwidth for EML operation.

SUMMARY

Embodiments of the present invention provide an improved switching mechanism for multi-link devices that can perform frame exchanges using multiple spatial streams and automatically switch back to a listening mode on enabled links at a deterministic time (according to predetermined rules) for improved throughput and reduced latency. Embodiments of the present invention are suitable for multi-link operations performed using a multi-radio device or a single-radio device.

According to one embodiment, a method of receiving data in a wireless network performed by a multi-link device (MLD) is disclosed. The method includes performing a listening operation on a plurality of enhanced multi-link single radio (EML) links of the wireless network, receiving an initial control frame from a wireless access point (AP) affiliated with an AP MLD over a first EML link of the plurality of EML links, enabling receiving on the first EML link using a plurality of spatial streams, performing a frame exchange to receive data from the AP over the first EML link using the plurality of spatial streams, and switching back to the listening operation on the plurality of EML links after the frame exchange is performed and a switch delay time.

According to some embodiments, the method includes performing a plurality of frame exchanges to receive data from the AP MLD over the first EML link using the plurality of spatial streams and ending frame exchanges with the AP by not to transmitting a response frame to the AP over the first EML link responsive to a recently received frame that requires immediate response.

According to some embodiments, the method includes performing a plurality of frame exchanges to receive data from the AP MLD over the first EML link using the plurality of spatial streams, and ending frame exchanges with the AP by transmitting a response frame indicating a switch back to the listening operation to the AP over the first EML link responsive to a recently received frame from the AP.

According to some embodiments, the method includes performing a plurality of frame exchanges to receive data from the AP MLD over the first EML link using the plurality of spatial streams, and ending frame exchanges with the AP after a timeout interval equal to aSIFSTime+aRxPHYStartDelay or aSIFSTime+aslotTime+aRxPHYStartDelay after transmitting a response frame responsive to a recently received frame from the AP when the medium is idle after transmitting a response frame to the AP.

According to some embodiments, the method includes performing a plurality of frame exchanges to receive data from the AP MLD over the first EML link using the plurality of spatial streams and ending frame exchanges with the AP after a timeout interval equal to aSIFSTime+aslotTime+aRxPHYStartDelay when the medium is idle after receiving a subsequent frame from the AP that does not require immediate response.

According to some embodiments, the frame exchange includes receiving a frame including a duration field from the AP, and further including initializing a timer according to the duration field, where the timer begins counting down receiving the subsequent frame.

According to some embodiments, the method includes ending the frame exchanges responsive to the timer reaching zero.

According to some embodiments, the method includes resetting the timer after a timeout interval equal to aSIFS-Time+aRxPHYStartDelay or aSIFSTime+aslotTime+aRxPHYStartDelay after transmitting a response frame responsive to a recently received frame from the AP.

According to some embodiments, the method includes receiving a second frame from the AP indicating to switch back to the listening operation, and the switching back to the listening operation on the plurality of EML links is performed responsive to the second frame.

According to a different embodiment, a method of transmitting data in a wireless network performed by a multi-link device (MLD) is disclosed. The method includes initiating frame exchanges with a wireless station (STA) MLD by transmitting an initial control frame to the STA MLD over a first EML link of a plurality of EML links and performing another frame exchange to transmit data to the STA MLD over the first EML link using a plurality of spatial streams of the wireless network responsive to receiving an immediate response frame from the STA MLD.

According to some embodiments, the method includes transmitting a second initial control frame to the STA when an immediate response frame solicited by the AP is not received.

According to another embodiment, a wireless communication device is disclosed. The device includes a wireless transceiver operable to communicate on a plurality of spatial streams in a wireless network, a memory, and a processor configured to perform a listening operation on a plurality of enhanced multi-link single radio (EML) links of the wireless network, receive an initial control frame from a wireless access point (AP) MLD over a first EML link of the plurality of EML links, enable receiving on the first EML link using the plurality of spatial streams, perform a frame exchange to receive data from the AP MLD over the first EML link using the plurality of spatial streams, and switch back to the listening operation on the plurality of EML links after the frame exchange is performed and a switch delay time.

According to some embodiments, the processor is further operable to perform a plurality of frame exchanges to receive data from the AP MLD over the first EML link using the plurality of spatial streams, and end frame exchanges with the AP by not to transmitting a response frame to the AP over the first EML link responsive to a recently received frame that requires immediate response.

According to some embodiments, the processor is further operable to perform a plurality of frame exchanges to receive data from the AP MLD over the first EML link using the plurality of spatial streams, and end frame exchanges with the AP by transmitting a response frame indicating a switch back to the listening operation to the AP over the first EML link responsive to a recently received frame from the AP.

According to some embodiments, the processor is further operable to perform a plurality of frame exchanges to receive data from the AP MLD over the first EML link using the plurality of spatial streams, and end frame exchanges with the AP after a timeout interval equal to aSIFSTime+aslotTime+aRxPHYStartDelay when the medium is idle after transmitting a response frame to the AP.

According to some embodiments, the processor is further operable to perform a plurality of frame exchanges to receive data from the AP MLD over the first EML link using the plurality of spatial streams, and end frame exchanges with the AP after a timeout interval equal to aSIFSTime+aslotTime+aRxPHYStartDelay when the medium is idle after receiving a subsequent frame from the AP that does not require immediate response.

According to some embodiments, the frame exchange includes receiving a frame including a duration field from the AP, the processor is further operable to initialize a timer according to the duration field, and the timer begins counting down receiving the subsequent frame.

According to some embodiments, the processor is further operable to end the frame exchanges responsive to the timer reaching zero.

According to some embodiments, the processor is further operable to reset the timer after a timeout interval equal to aSIFSTime+aRxPHYStartDelay or aSIFSTime+aslotTime+aRxPHYStartDelay after transmitting a response frame responsive to a recently received frame from the AP.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
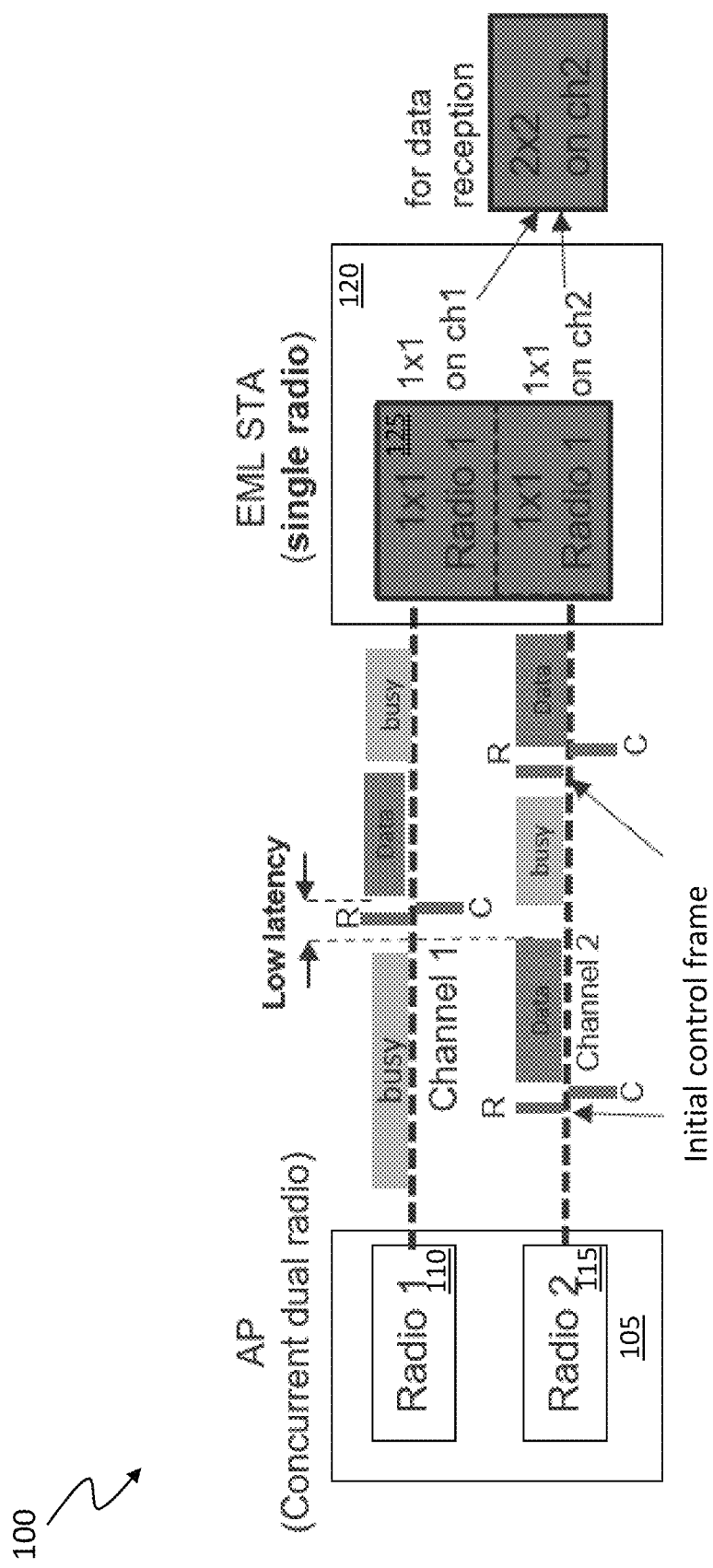
FIG. 1 is a block diagram of an exemplary wireless network for performing multi-link operations using a single-radio non-AP MLD operating in EML mode.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Automatic Multi-Channel EML Operation for Multi-Link Devices

Embodiments of the present invention provide improved enhanced multi-link single radio operation (EML) for multi-link devices that can perform frame exchanges using multiple spatial streams and automatically switch back to a listening mode on enabled links deterministically for improved throughput and reduced latency. Embodiments of the present invention are suitable for multi-link operations performed using a multi-radio device or a single-radio device.

According to one approach for automatically switching to a listening mode on one or more EML channels, each STA of a non-AP MLD operating on enhanced multi-link single radio operation (EML) channels listens to a respective channel using 1×1 spatial stream to receive an initial control frame. When an AP MLD obtains channel access on one of the EML channels, the AP MLD transmits an initial control frame on that channel. An STA listening on the same channel receives the initial control frame and responsively enables multiple spatial streams to receive data on that channel (e.g., the STA switches all antennas to the channel that received the initial control frame).

A wireless access point (AP) multi-link device (MLD) can initiate frame exchanges with a non-AP MLD operating in EML mode on one of the enabled links by transmitting an initial control frame to a wireless station (STA) of the non-AP MLD. After receiving the initial control frame on one of the enabled links, the non-AP MLD may initiate a timer (e.g., an E-timer) to keep track of the duration of the frame exchange sequence initiated by the AP MLD. The timer may be initialized with the duration from the Duration/ID field in the initial control frame received from the AP of the AP MLD. If the target STA fails to respond to the initial control frame (e.g., due to the medium being detected as busy, due to a scheduled broadcast frame reception on other links of the EML links, etc.), then the STA ends the frame exchange and switches back to the listening operation on the EML links after the switching delay. The timer is reset after the end of received control frame plus a specific interval, such as aSIFSTime+aRxPHYStartDelay, where the variables SIFSTime+aRxPHYStartDelay are defined by the capabilities of the wireless network. This may occur when channel sensing indicates that the channel is busy, or a broadcast frame reception is scheduled on the other link of the EML links, for example. If the medium is idle for a timeout interval after the end of the transmission of the physical layer protocol data unit (PPDU) by the STA of the non-AP MLD in response to the received initial control frame from the AP of the AP MLD (e.g., aSIFSTime+aRxPHYStartDelay), then the STA ends the frame exchange and switches back to the listening operation on the EML links after the switching delay. If the medium is idle for a timeout interval after the end of the transmission of the physical layer protocol data unit (PPDU) by the STA of the non-AP MLD in response to the received data frame (non-initial control frame) from the AP of the AP MLD (e.g., aSIFSTime+aSlotTime+aRxPHYStartDelay), then the STA ends the frame exchange and switches back to the listening operation on the EML links after the switching delay. The timer is reset to zero. The STA may also end the frame exchange and switch back to the listening operation on the EML links when the medium is idle after a response frame is received in response to a frame which is not initial control frame.

The timer may begin counting down from the end of the reception of the PPDU containing that frame and may be re-initialized/updated with the duration from the Duration/ID field in the non-initial frame most recently received from the AP of the AP MLD that initiated the frame exchange. In response to the frame most recently received from the AP of the AP MLD, the timer maintains the current value and continues counting down if the medium is idle for a timeout interval after the end of the transmission of the PPDU in response to the received PPDU by the STA of the non-AP MLD (e.g., aSIFSTime+aSlotTime+aRxPHYStartDelay). If the medium is idle for a timeout interval after the end of the reception of the PPDU containing a frame from the AP of the AP MLD that does not require immediate acknowledgement (e.g., aSIFSTime+aSlotTime+aRxPHYStartDelay), the timer keeps the current value and continues counting down.

The AP MLD may indicate to request the STA "switching back" to a listening operation in the PPDU transmitted to the STA of the non-AP MLD in EML mode, for example, due to there being no more data to transmit or an early TXOP termination.

According to some embodiments, the non-AP MLD switches back to the listening operation on the EML links after the end of the frame exchanges and the switching delay time if any of the following conditions is met:
1. The timer in the STA of the non-AP MLD has a zero value;
2. The STA of the non-AP MLD has transmitted a response to the most recently received PPDU indicating "switching back" from the AP of the AP MLD;
3. The STA of the non-AP MLD has received a PPDU indicating "switching back" that does not require immediate response from the AP of the AP MLD.

When the transmission by the AP of the AP MLD of the initial control frame or a non-initial control frame fails (e.g., the AP fails to receive a response to the transmitted frame), if the AP of the AP MLD intends to continue the transmission to the same non-AP MLD (within the existing TXOP), the AP may begin the frame exchange by transmitting another initial control frame to the STA of the non-AP MLD. The AP may perform a backoff-off procedure before transmitting another initial control frame to the non-AP MLD if the initial control frame is transmitted on the other link of the EML links. When the AP of the AP MLD transmits a non-initial PPDU within the TXOP that fails to receive the response frame from the STA, the AP may continue the frame exchanges (eg., aSIFS+aSlotTime after the end of the frame transmitted by the AP) with the STA of the non-AP MLD without transmitting the initial control frame to the non-AP MLD (within the existing TXOP). The AP may perform a back-off procedure as a continuation of the existing TXOP before the continuation of the transmission. If the AP of the AP MLD performs a backoff procedure within its existing TXOP it may not extend the TXNAV timer value. In this case, the non-AP MLD continues counting down the timer.

FIG. 1 depicts an exemplary wireless network 100 for performing multi-link operations using a single-radio non-AP MLD operating in EML mode. AP 105 includes a concurrent dual radio with Radio 1 (110) and Radio 2 (115) operating on wireless channels Channel 1 and Channel 2, respectively. As depicted in FIG. 1, Channel 1 is initially busy and Channel 2 is initially available. AP MLD 105 transmits an initial MU-RTS frame (R) over Channel 2 to initiate a frame exchange with non-AP (STA) MLD 120. In response, non-AP MLD 120 transmits a CTS frame to AP MLD 105 over Channel 2. Data is then transmitted in an EML operation from AP MLD 105 to non-AP MLD 120 over Channel 2 using Radio 2 115 of AP MLD 105 and radio 125 of non-AP MLD 120, where radio 125 is configured to operate on Channel 1 and Channel 2 in EML mode for frame exchanges. Non-AP MLD 120 does not transmit or receive on any other links when participating frame exchanges with the AP MLD on one link until the end of the frame exchange sequence in EML mode.

Non-AP MLD 120 can receive a PPDU that is sent using Channel 2 with multiple spatial streams (e.g., 2×2 spatial streams) a short interframe space (SIFS) after the end of its response frame C. However, when AP MLD 110 has stopped transmitting data on Channel 2 and Channel 1 has become available to send a new initial control frame to initiate new frame exchanges, the non-AP MLD 120 may not be able to receive the new initial frame on Channel 1 because it is not yet switching back to listening operation on Channel 1 and Channel 2. In this example, AP MLD 110 does not know when non-AP MLD 120 will switch to a listening mode on Channel 1 and Channel 2. Accordingly, in order to mitigate or prevent missing the reception of an initial control frame by the non-AP MLD 120, it is advantageous for non-AP MLD 120 to deterministically switch to a listening mode on Channel 1 and Channel 2 after transmitting or receiving data in a multi-link EML operation on one channel (e.g., Channel 2) so that an available link can be utilized efficiently.

Figure 2:
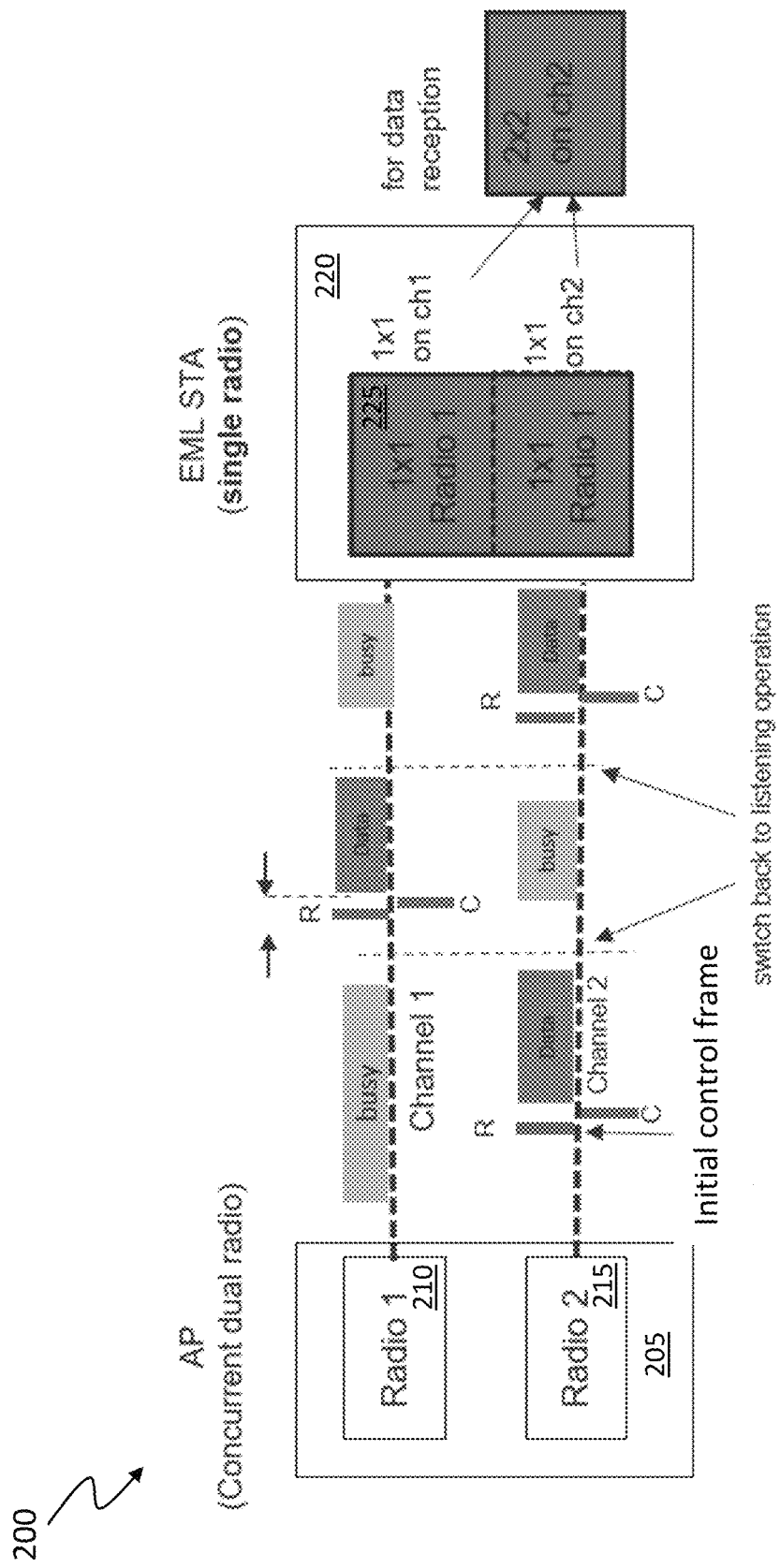
FIG. 2 is a block diagram depicting an exemplary wireless network for performing multi-link operations using a single-radio STA MLD operating in EML mode that deterministically switches to a listening mode on available links to mitigate latency according to embodiments of the present invention.

FIG. 2 depicts an exemplary wireless network 200 for performing multi-link operations using a single-radio MLD operating in EML mode that deterministically switches to a listening mode on links enabled for EML mode to mitigate latency and improve the efficiency of utilizing links enabled for EML mode according to embodiments of the present invention. AP MLD 205 includes a concurrent dual radio with Radio 1 (210) and Radio 2 (215) operating on wireless channels Channel 1 and Channel 2, respectively. As depicted in FIG. 2, AP MLD initiates a frame exchange sequence with a non-AP (STA) MLD 220 operating in EML mode on one of links enabled for EML mode (e.g., Channel 2) by transmitting an initial Control frame (R) to an STA of the non-AP MLD. Non-AP MLD 220 operating in EML mode performs a listening operation with a 1×1 spatial stream on each wireless link (e.g., Channel 1 and Channel 2).

When receiving an initial control frame from the AP of AP MLD 205 on one of the enabled links for EML mode, the non-AP MLD 220 enables multiple spatial streams (2×2) on that link (e.g., Channel 2) and the STA of non-AP MLD 220 operating on that link performs the frame exchanges with multiple spatial streams (2×2) after responding to the received initial control frame. Non-AP MLD 220 switches back to the listening operation on enabled links (e.g., Channel 1, Channel 2, and/or other wireless links) after the frame exchange has ended and a switching delay time has passed. In this way, a new frame exchange can be initiated using one of the enabled links when the link is available to reduce latency and improve wireless performance.

Figure 3:
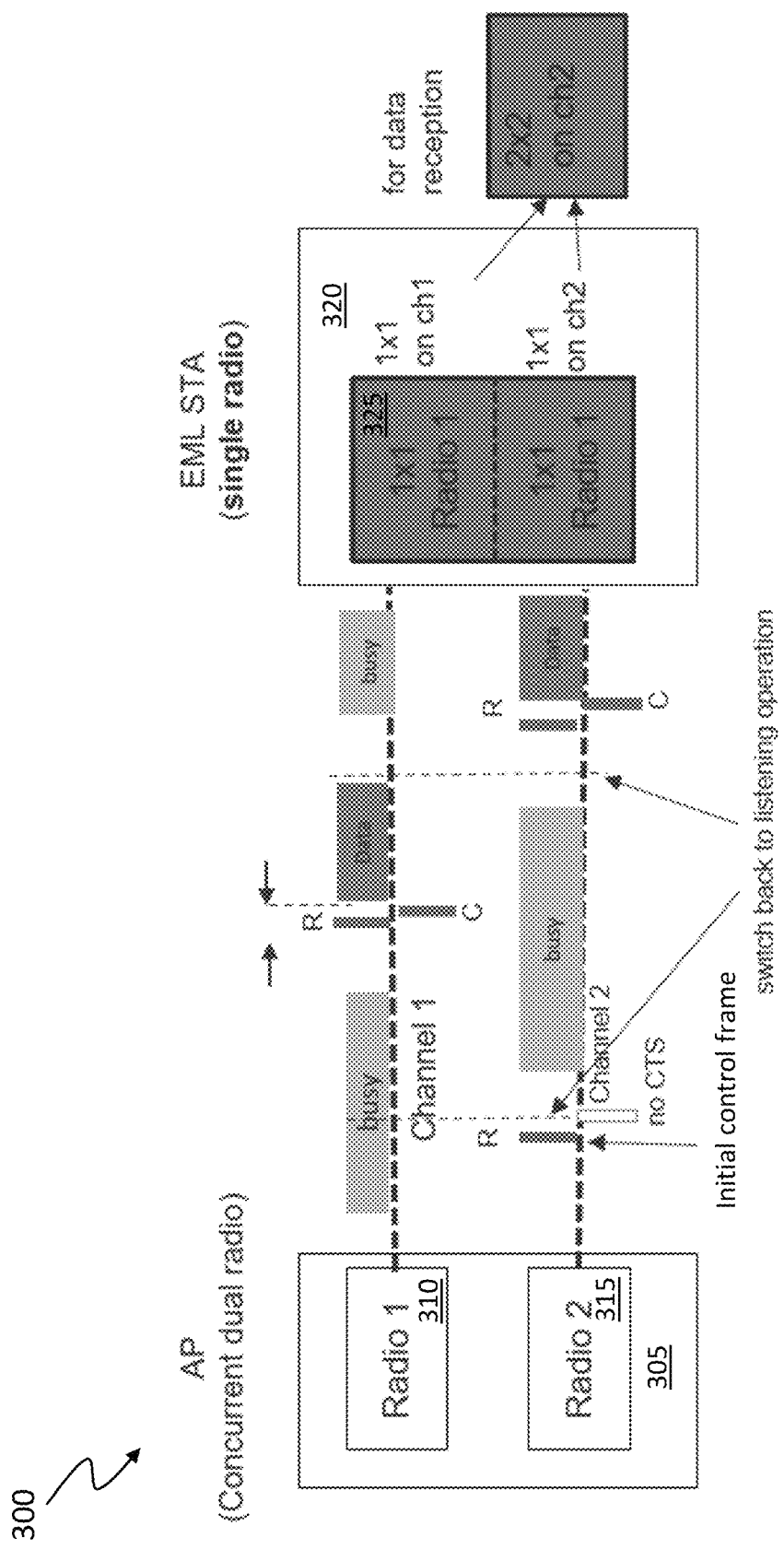
FIG. 3 is a block diagram depicting an exemplary wireless network for performing multi-link operations using a single-radio STA MLD operating in EML mode that deterministically switches to a listening mode when a link is unavailable to mitigate latency according to embodiments of the present invention.

FIG. 3 depicts an exemplary wireless network 300 for performing multi-link operations using a single-radio MLD operating in EML mode that deterministically switches to a listening mode when STA of the MLD ends the frame exchange by not transmitting the response frame in responsive to the received frame, e.g., when the link is unavailable due to channel busy; or when the STA has a pre-scheduled data reception (e.g., broadcast frame reception) on the other link of EML links, according to embodiments of the present invention. AP MLD 305 includes a concurrent dual radio with Radio 1 (310) and Radio 2 (315) operating on wireless channels Channel 1 and Channel 2, respectively. As depicted in FIG. 3, Channel 1 is initially busy detected by AP MLD 305. An AP of the AP MLD obtains the channel access on Channel 2 and transmits an initial control frame. An STA of non-AP MLD 320 receives an initial control frame (R) from the AP of the AP MLD 305 causing the STA to enable the link with multiple spatial stream (e.g., two receiving antenna and two transmitting antenna) for performing frame exchanges.

Because the channel 2 is physically or virtually busy detected by the STA, the STA cannot respond to the initial control frame. Accordingly, to prevent missing new initial control frame, non-AP MLD 320 switches back to a listening operation on the EML enabled links after the end of initial control frame plus a time interval (e.g., aSIFSTime+aRx-PHYStartDelay or aSIFSTime) and a switch delay time. In this way, the switch to the listening mode on the EML enabled links is deterministic. Accordingly, non-AP MLD 320 can subsequently receive a control frame on Channel 1 and responds with a response frame to initiate a frame exchange for receiving data on Channel 1 using a 2×2 spatial stream in EML mode. After the frame exchange is complete, the process can be performed again when Channel 2 becomes available for an EML operation using a 2×2 spatial stream on Channel 2. Non-AP MLD 320 switches back to a listening operation after the end of frame exchange.

Figure 4:
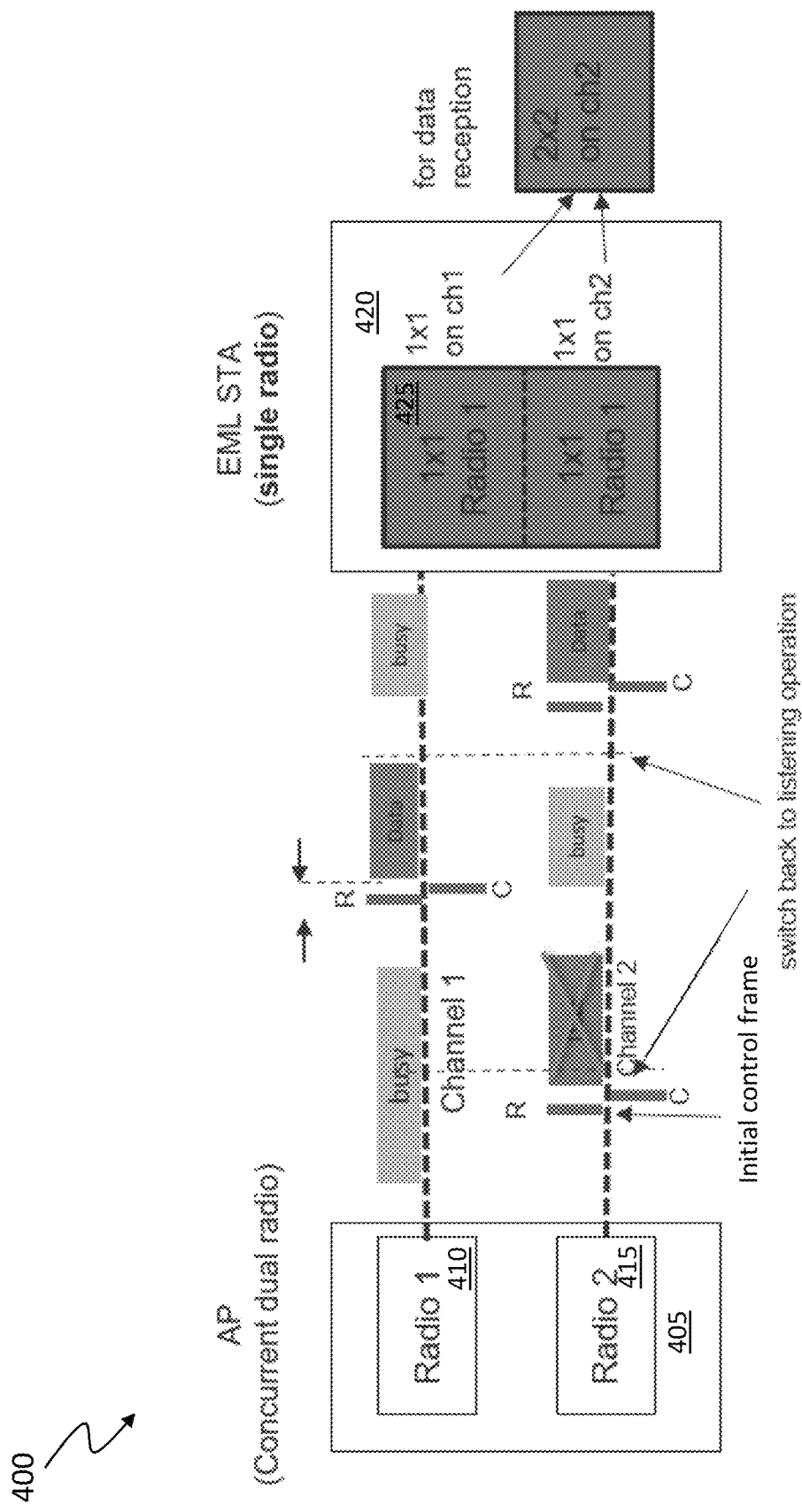
FIG. 4 is a block diagram depicting an exemplary wireless network for performing multi-link operations using a single-radio STA MLD operating in EML mode that deterministically switches to a listening mode after a reception failure by the STA MLD to mitigate latency according to embodiments of the present invention.

FIG. 4 depicts an exemplary wireless network 400 for performing multi-link operations using a single-radio MLD operating in EML mode that deterministically switches to a listening mode after a reception failure by the STA of the MLD to mitigate latency and improve the efficiency of utilizing links enabled for EML mode according to embodiments of the present invention. AP MLD 405 includes a concurrent dual radio with Radio 1 (410) and Radio 2 (415) operating on wireless channels Channel 1 and Channel 2, respectively. As depicted in FIG. 4, an STA of non-AP MLD 420 receives an initial control frame from an AP of the AP MLD 405 on an enabled link (Channel 2). Accordingly, the STA of non-AP MLD 420 enables the link with a 2×2 spatial stream on Channel 2 to perform the frame exchanges. However, in some cases, the STA of non-AP MLD 420 may not successfully receive the frame transmitted by the AP after responding to the initial control frame. Accordingly, non-AP MLD 420 switches back to a listening operation on the enabled links (e.g., Channel 1, Channel 2, and/or other wireless links) after the end of transmission of the response to the initial control frame plus a time interval (e.g., aSIFSTime+aSlotTime+aRxPHYStartDelay or aSIFSTime+aRx-PHYStartDelay) and a switch delay time. In this way latency is advantageously reduced by utilizing available links when the STA deterministically switches back to a listening mode.

For performing uplink (UL) transmissions, a non-AP MLD operating in EML mode may initiate frame exchanges with an AP of an AP MLD on an enabled link, and the AP of the AP MLD initiates timer representing the duration information of the frame exchange sequence initiated by the non-AP MLD. For example, the timer can be initialized with the duration specified in the Duration/ID field of the frame most recently received from the STA of the non-AP MLD that initiated the frame exchange. The timer in the AP of the AP MLD shall be reset to zero if the medium is idle for a timeout interval (eg. aSIFSTime+aRxPHYStartDelay) after the end of the transmission of the PPDU by the AP of the AP MLD as a response to the received initial frame from the STA of the non-AP MLD.

The timer in the AP of the AP MLD begins counting down from the end of the reception of the PPDU containing that frame and is re-initialized/updated using the duration specified the Duration/ID field in the non-initial frame most recently received from the STA of the non-AP MLD that initiated the frame exchange. If the medium is idle for a timeout interval (e.g., aSIFSTime+aSlotTime+aRxPHYStartDelay) after the end of the transmission of the PPDU by the AP of the AP MLD (in response to the frame most recently received from the STA of the non-AP MLD), then the timer maintains the current value and continues counting down. If the medium is idle for a timeout interval (e.g., aSIFSTime+aSlotTime+aRxPHYStartDelay) after the end of the reception of the PPDU containing a frame from the STA of the non-AP MLD that does not require immediate acknowledgement, the timer maintains the current value and continue counting down.

The non-AP MLD in EML mode may indicate "switching back" to a listening mode in the PPDU transmitted to the AP of the AP MLD, for example, when there is no more data to transmit or the TXOP terminates early. Moreover, the non-AP MLD may switch back to the listening operation after the switching delay time if any of the following conditions is met:

1. The TXNAV timer has a zero value;
2. The medium is idle for a timeout interval after the end of the transmission of the initial PPDU by the STA of the non-AP MLD;
3. The STA of the non-AP MLD has indicated "switching back" to listening mode in the most recently transmitted PPDU that does not require immediate response;
4. The STA of the non-AP MLD has received the solicited response of the most recently transmitted PPDU indicating "switching back."

The AP MLD may invoke a new backoff and initiate a frame exchange with the non-AP MLD operating in EML mode on one of the enabled links after the switching delay time indicated by the non-AP MLD if any of the following conditions is met:

1. The timer in the AP of the AP MLD has a zero value;
2. The AP of the AP MLD has transmitted a response to the most recently received PPDU indicating "switching back" from the STA of the non-AP MLD;
3. The AP of the AP MLD has received a PPDU indicating "switching back" that does not require immediate response from the STA of the non-AP MLD.

Figure 5:
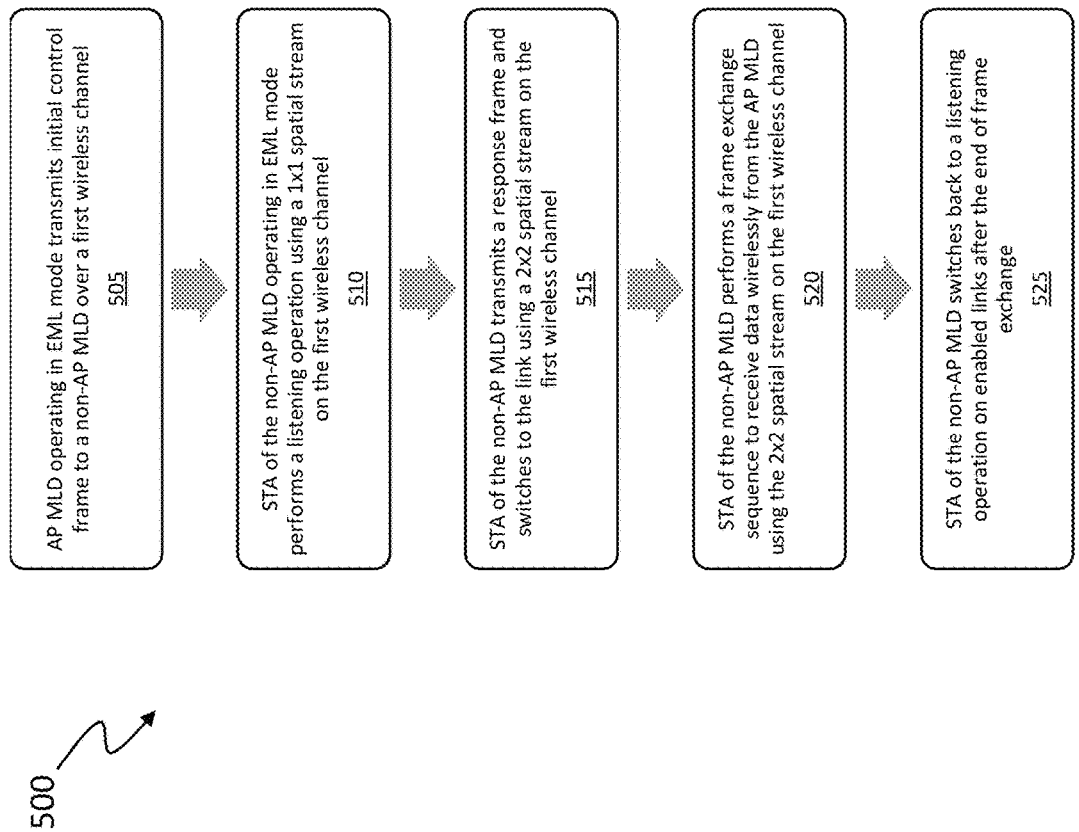
FIG. 5 is a flow chart depicting an exemplary sequence of computer implemented steps of a process for performing a downlink EML operation and automatically switching back to a listening mode on enabled wireless links using a multi-link device in a wireless network according to embodiments of the present invention.

FIG. 5 is a flow chart depicting an exemplary sequence of computer implemented steps of a process 500 for performing a downlink EML operation and automatically switching back to a listening mode on enabled wireless links according to embodiments of the present invention. Some steps of the process can be performed by a multi-link non-AP having a single radio operating on multiple spatial streams (e.g., 2×2).

At step 505, an AP MLD operating in EML mode transmits an initial control frame (e.g., an MU-RTS frame) to a non-AP MLD over a first wireless channel in the wireless network. The control frame includes a Duration/ID field indicating a duration of a frame exchange sequence.

At step 510, a non-AP MLD operating in EML mode performs a listening operation using a 1×1 spatial stream on wireless channels enabled for EML operation. A STA of the non-AP MLD receives the initial control frame on the first wireless channel and enables receiving frames using multiple spatial streams after sending the response frame in responsive to the initial control frame. The non-AP MLD may switch back to the listening operation on the EML enabled links after the end of frame exchanges plus the switching delay time.

At step 515, the STA of the non-AP MLD transmits a response frame (e.g., a CTS frame) to the AP MLD and enables 2×2 spatial stream on the first wireless channel. The non-AP MLD stops transmitting or receiving data on other enabled links.

At step 520, the STA of the non-AP MLD performs a frame exchange sequence to receive data wirelessly from the AP MLD using the 2×2 spatial stream on the first wireless channel. The frame exchange can include receiving a PPDU, for example. If the medium is idle for a timeout interval (e.g., aSIFSTime+aSlotTime+aRxPHYStartDelay) after the end of the transmission of the PPDU by the STA of the non-AP MLD in response to the frame most recently received from the AP of the AP MLD, then the STA ends the frame exchange. The timer keeps the current value and continues counting down after the frame exchange ends. If the medium is idle for a timeout interval (e.g., aSIFSTime+ aSlotTime+aRxPHYStartDelay) after the end of the reception of the PPDU containing a frame from the AP of the AP MLD that does not require immediate acknowledgement, then the STA ends the frame exchange. The timer keeps the current value and continue counting down.

At step 525, the STA of the non-AP MLD switches back to a listening operation on enabled links after the end of frame exchange. Step 525 can include switching back to the listening operation on enabled wireless links after the switching delay time when the medium is idle for a timeout interval (e.g., aSIFSTime+aSlotTime+aRxPHYStartDelay) after the STA of the non-AP MLD has transmitted a response to the most recently received PPDU, or when the medium is idle for a timeout interval (e.g., aSIFSTime+aSlotTime+ aRxPHYStartDelay) after the STA of the non-AP MLD has received a PPDU that is not required an immediate response, or the STA of the non-AP MLD has transmitted a response to the most recently received PPDU indicating "switching back" from the AP of the non-AP MLD, or the STA of the non-AP MLD has received a PPDU indicating "switching back" that does not require immediate response from the AP of the AP MLD. For example, the AP MLD may indicate "switching back" in the PPDU transmitted to the STA of the non-AP MLD in EML mode.

Exemplary Computer Controlled System

Figure 6:
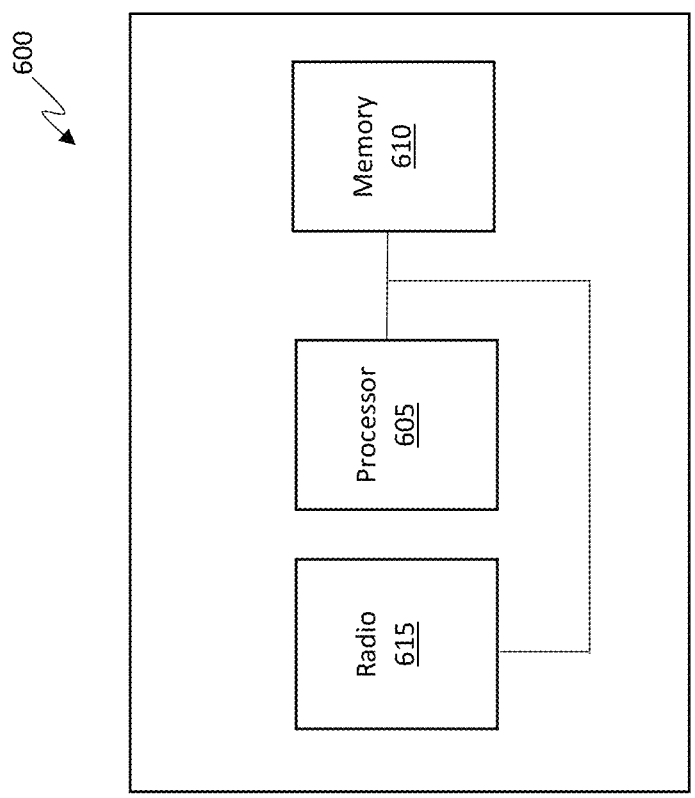
FIG. 6 is a block diagram depicting an exemplary computer system platform upon which embodiments of the present invention may be implemented.

FIG. 6 depicts an exemplary wireless device 600 upon which embodiments of the present invention can be implemented. Embodiments of the present invention are drawn to wireless devices that can automatically switch channels to perform an EML operation in a wireless network according to embodiments of the present invention. The following discussion describes one such exemplary electronic system or computer system that can be used as a platform for implementing embodiments of the present invention. The exemplary computer system 612 can be a wireless access point or a wireless station, for example.

Wireless device 600 can deterministically switching to a listening mode on an enabled link performing a frame exchange sequence using the enabled link to efficiently receive data from another multi-link device in the wireless network. Wireless device 600 can include a single radio operating on multiple spatial streams (e.g., 2×2). Wireless device 600 includes a processor 605 for running software applications and optionally an operating system. Memory 610 can include read-only memory and/or random access memory, for example, to store applications and data (e.g., tables of index values) for use by the processor 605 and data received or transmitted by radio 615. Radio 615 can communicate with other electronic devices over a wireless network u (e.g., WLAN) using multiple spatial streams (e.g., multiple antennas) and typically operates according to IEEE standards (e.g., IEEE 802.11ax, IEEE 802.11ay, IEEE 802.11be, etc.).

Embodiments of the present invention are thus described. While the present invention has been described in particular embodiments, it should be appreciated that the present invention should not be construed as limited by such embodiments, but rather construed according to the following claims.

What is claimed is:

1. A method of receiving data in a wireless network performed by a multi-link device (MLD), the method comprising:
    performing a listening operation on a plurality of enhanced multi-link (EML) single radio links of the wireless network;
    receiving an initial control frame from a wireless access point (AP) affiliated with an AP MLD over a first EML single radio link of the plurality of EML links;
    enabling receiving on the first EML single radio link using a plurality of spatial streams;
    performing a frame exchange to receive data from the AP over the first EML single radio link using the plurality of spatial streams;
    switching back to the listening operation on the plurality of EML single radio links after the frame exchange is performed and a switch delay time;
    performing a plurality of frame exchanges to receive data from the AP MLD over the first EML single radio link using the plurality of spatial streams; and
    ending frame exchanges with the AP after a timeout interval equal to aSIFSTime+aRxPHYStartDelay or aSIFSTime+aslotTime+aRxPHYStartDelay after transmitting a response frame responsive to a recently received frame from the AP when the medium is idle after transmitting a response frame to the AP.

2. The method of claim 1, further comprising:
    performing a plurality of frame exchanges to receive data from the AP MLD over the first EML single radio link using the plurality of spatial streams; and
    ending frame exchanges with the AP by not transmitting a response frame to the AP over the first EML single radio link responsive to a recently received frame that requires immediate response.

3. The method of claim 1, further comprising:
    performing a plurality of frame exchanges to receive data from the AP MLD over the first EML single radio link using the plurality of spatial streams; and
    ending frame exchanges with the AP by transmitting a response frame indicating a switch back to the listening operation to the AP over the first EML single radio link responsive to a recently received frame from the AP.

4. The method of claim 1, further comprising:
    performing a plurality of frame exchanges to receive data from the AP MLD over the first EML single radio link using the plurality of spatial streams; and
    ending frame exchanges with the AP after a timeout interval equal to aSIFSTime+aslotTime+aRxPHYStartDelay when the medium is idle after receiving a subsequent frame from the AP that does not require immediate response.

5. The method of claim 1, wherein the frame exchange comprises receiving a frame comprising a duration field from the AP, and further comprising initializing a timer according to the duration field, wherein the timer begins counting down receiving the subsequent frame.

6. The method of claim 5, further comprising ending the frame exchanges responsive to the timer reaching zero.

7. The method of claim 5, further comprising resetting the timer after a timeout interval equal to aSIFSTime+aRxPHYStartDelay or aSIFSTime+aslotTime+aRxPHYStart- Delay after transmitting a response frame responsive to a recently received frame from the AP.

8. The method of claim 1, further comprising receiving a second frame from the AP indicating to switch back to the listening operation, wherein the switching back to the listening operation on the plurality of EML single radio links is performed responsive to the second frame.

9. A method of transmitting data in a wireless network performed by a multi-link device (MLD), the method comprising:
  initiating frame exchanges with a wireless station (STA) MLD by transmitting an initial control frame to the STA MLD over a first enhanced multi-link single radio (EML) link of a plurality of EML single radio links while the STA MLD operates in a listening mode on the plurality of EML single radio links;
  performing another frame exchange to transmit data to the STA MLD over the first EML single radio link using a plurality of spatial streams of the wireless network responsive to receiving an immediate response frame from the STA MLD; and
  transmitting a second initial control frame to the STA when an immediate response frame is not received.

10. A wireless communication device, comprising:
  a wireless transceiver operable to communicate on a plurality of spatial streams in a wireless network;
  a memory; and
  a processor configured to:
    perform a listening operation on a plurality of enhanced multi-link (EML) single radio links of the wireless network;
    receive an initial control frame from a wireless access point (AP) MLD over a first EML single radio link of the plurality of EML single radio links;
    enable receiving on the first EML single radio link using the plurality of spatial streams;
    perform a frame exchange to receive data from the AP MLD over the first EML link using the plurality of spatial streams;
    switch back to the listening operation on the plurality of EML single radio links after the frame exchange is performed and a switch delay time;
    perform a plurality of frame exchanges to receive data from the AP MLD over the first EML single radio link using the plurality of spatial streams; and
    end frame exchanges with the AP after a timeout interval equal to aSIFSTime+aslotTime+aRxPHYStartDelay when the medium is idle after transmitting a response frame to the AP.

11. The wireless communication device of claim 10, wherein the processor is further operable to:
  perform a plurality of frame exchanges to receive data from the AP MLD over the first EML single radio link using the plurality of spatial streams; and
  end frame exchanges with the AP by not transmitting a response frame to the AP over the first EML single radio link responsive to a recently received frame that requires immediate response.

12. The wireless communication device of claim 10, wherein the processor is further operable to:
  perform a plurality of frame exchanges to receive data from the AP MLD over the first EML single radio link using the plurality of spatial streams; and
  end frame exchanges with the AP by transmitting a response frame indicating a switch back to the listening operation to the AP over the first EML single radio link responsive to a recently received frame from the AP.

13. The wireless communication device of claim 10, wherein the processor is further operable to:
  perform a plurality of frame exchanges to receive data from the AP MLD over the first EML single radio link using the plurality of spatial streams; and
  end frame exchanges with the AP after a timeout interval equal to aSIFSTime+aslotTime+aRxPHYStartDelay when the medium is idle after receiving a subsequent frame from the AP that does not require immediate response.

14. The wireless communication device of claim 10, wherein the frame exchange comprises receiving a frame comprising a duration field from the AP.

15. The wireless communication device of claim 14, wherein the processor is further operable to initialize a timer according to the duration field, wherein the timer begins counting down receiving the subsequent frame.

16. The wireless communication device of claim 15, wherein the processor is further operable to end the frame exchanges responsive to the timer reaching zero.

17. The wireless communication device of claim 15, wherein the processor is further operable to reset the timer after a timeout interval equal to aSIFSTime+aRxPHYStartDelay or aSIFSTime+aslotTime+aRxPHYStartDelay after transmitting a response frame responsive to a recently received frame from the AP.

* * * * *